3,470,346
PROTECTIVE ATMOSPHERE FOR THE ARC
WELDING AND SURFACING OF STEELS
Georges Duboz, Paris, and Paul Demars, Fontenay-sous-Bois, France, assignors to L'Air Liquide, Societe Anonyme Pour l'Etude et l'Exploitation des Procedes Georges Claude
No Drawing. Filed May 23, 1966, Ser. No. 551,928
Claims priority, application France, June 2, 1965,
19,179
Int. Cl. H05b 11/00
U.S. Cl. 219—74     13 Claims

ABSTRACT OF THE DISCLOSURE

Shielding gas for electric arc welding with droplet and short-circuit deposition. The gas consists of a rare gas from the group of 20–90% helium and helium plus neon, 0.5–2% hydrogen, and a balance of argon. The neon in the helium plus neon member is in an amount up to 30% of the member. The hydrogen component can be free or combined and the mixture can optionally include gases and/or vapours free from halogen, but containing oxygen, optionally carbon and optionally hydrogen, the proporion of the total of these gases and vapours and hydrogen being between 2 and 6%. The inclusion of hydrogen in the mixture limits the sputtering of metal on the edges of the bead.

---

The present invention relates to a protective atmosphere which is based on rare gas and which contains at least one non-inert gas, for the arc welding and surfacing of steel in a protective atmosphere with a consumable electrode formed by a high alloy steel wire. It is intended particularly for the welding of alloy steels with an austenitic or austenoferritic structure with a low percentage of ferrite, particularly nickel-chromium steels.

It is characterized in that the said protective atmosphere is composed of: helium, 20 to 90%; hydrogen, free or combined with an element other than an halogen; 0.5 to 2% (hydrogen percentages throughout, whether free or combined, are given as though the hydrogen were free); optionally gases and/or vapours free from halogen, but containing oxygen, optionally carbon and optionally hydrogen, the proportion of the total of these gases and vapours and hydrogen being between 2 and 6%; argon, forming the complement, these percentages being indicated by volume.

Such an atmosphere permits the welding, both when working under conditions in which the molten metal of the electrode is transported towards the welding bath in the form of droplets, and when working under conditions where there are alternations of short-circuits with the molten welding bath and short arcs.

The operation of arc welding, more particularly according to this latter procedure, is difficult with high alloy steels. An atmosphere composed mainly of helium, with a small quantity of argon and even smaller quantity of carbon dioxide has been proposed (French Patent No. 1,378,908) for the welding of these steels. It gives better results than carbon dioxide and than the mixture of argon with oxygen or with carbon dioxide, used commercially for the welding of mild or low alloy steels; nevertheless, the molten bath obtained is fairly fluid and this particularly is an inconvenience for the welding in all positions; moreover, in order to limit the spattering of metal on the edges of the bead, it is necessary for the welding parameters to be accurately determined.

The mixtures according to the invention do not have these disadvantages, because they contain hydrogen. This element, which is usually eliminated as far as is possible from the materials serving for arc welding, this mainly in order to avoid porous welds, plays a very important and beneficial part in the case of the atmosphere according to the invention; the possible presence of oxygen and carbon in these atmospheres still further improves the results which are obtained.

For the two welding methods referred to above, the atmospheres according to the invention make it possible to obtain welds of good appearance, particularly without oxidation or porosity, a good anchoring of the deposited metal on the metal sheets to be welded and a stable arc, and they also make possible the production of joints by welding in any position and even on thin sheets or at the base of a bevel and a great reduction in the spattering. It is also established that these atmospheres give a high degree of latitude in the selection of the electrical parameters being used: current density, arc voltage, inductance of the current generator. The mechanical characteristics of the welded asemblies obtained with these atmospheres are good.

The following numerical data can be given by way of example.

Metal was deposited in a mould from a stainless steel wire of type 18/8 with a low carbon content and a diameter of 0.8 mm. The welding current had an average intensity of 120 amp and an average direct voltage of 17 volts; the welding conditions were those in which short-circuits and short arcs succeeded one another in rapid sequence.

The protective atmosphere, supplied from a cylinder in which the mixture had been compressed, corresponded to the following specifications:

|  | Percent |
|---|---|
| Helium | 30 to 33 |
| Carbon dioxide | 3 to 3.5 |
| Hydrogen | 0.8 to 1.2 |
| Argon, the remainder. | |

Test pieces were taken from the metal thus deposited and then tested. They had the following characteristics: tensile strength (cylindrical test element with a diameter of 9.78 mm.), 62 kg./mm.$^2$; elongation (length equal to 7 times the diameter), 40%; resilience (Charpy V), 15 kgm./cm.$^2$ at 20° C., 6.5 kgm./cm.$^2$ at 196° C.

The resistance to corrosion, in sulphuric and cupric solution at boiling point for 72 hours, was perfect.

Satisfactory results were obtained with atmospheres of which the composition was between the following limits:

|  | Percent |
|---|---|
| Helium | 20 to 90 |
| Carbon dioxide | 1.5 to 4 |
| Hydrogen | 0.5 to 2 |
| Argon, the remainder. | |

It is also possible to obtain good results with mixtures of which the active portion, that is to say, other than the rare gases, comprises other constituents, for example: oxygen and acetylene; oxygen and propane or butane.

In these active portions, the hydrocarbons supply the hydrogen and the carbon. A small addition of carbon dioxide to the mixture of oxygen and propane is frequently useful.

The active portion can also contain vapours. For example, it is possible to use a mixture of helium and argon which can be employed for the welding of light alloys and to cause it to bubble into alcohol (methyl or other alcohol), into benzene, petroleum ether or even water. In the case of water and alcohols, it is useful to add a little oxygen and possibly a little carbon dioxide. It is also possible to cause the mixture of helium and argon to pass over naphthalene and possibly to add a small quantity of oxygen.

Neon can be substituted to an amount of 10 to 30% for the helium.

In general manner, the hydrogen can even be supplied in the form of chemical combinations in the gas or vapour state which can contain carbon and oxygen. It is however necessary to avoid the use of chemical combinations which, in addition to hydrogen, oxygen and carbon, would contain chemical elements, such as the halogens, which are capable of being harmful or dangerous.

By way of example, the chlorinated combinations are to be prohibited because, under the effect of the arc and its radiations, they would cause formation of gases which physiologically are very dangerous, such as carbon oxychloride (phosgene).

What we claim is:

1. A protective atmosphere for electric arc welding with a high alloy steel consumable electrode, the atmosphere consisting essentially, in volume percent, of a halogen-free mixture of gas, as follows:
    (a) 20–90% of a member selected from the class consisting of helium and helium plus neon with the neon in an amount up to 30% of the helium plus neon;
    (b) 0.5–2% hydrogen;
    (c) balance essentially argon.

2. A protective atmosphere as claimed in claim 1, at least a portion of said hydrogen being combined with carbon.

3. A protective atmosphere as claimed in claim 1, at least a portion of said hydrogen being combined with oxygen.

4. A protective atmosphere as claimed in claim 1, at least a portion of said hydrogen being combined with carbon and oxygen.

5. A protective atmosphere for electric arc welding with a high alloy steel consumable electrode, the atmosphere consisting essentially, in volume percent, of a halogen-free mixture of gas, as follows:
    (a) 20–90% of a member selected from the class consisting of helium and helium plus neon with the neon in an amount up to 30% of the helium plus neon;
    (b) 0.5–2% hydrogen;
    (c) 2–6% of gas containing oxygen, the last-named gas including said hydrogen;
    (d) balance essentially argon.

6. A protective atmosphere as claimed in claim 5, said helium being 30–33% and said last-named gas containing carbon, hydrogen and oxygen and being present in the proportion 3.8–5%.

7. A protective atmosphere as claimed in claim 6, said last-named gas containing 3.8–5% carbon dioxide and 0.8–1.2% hydrocarbon.

8. A protective atmosphere as claimed in claim 5, said last-named gas consisting essentially of carbon dioxide and hydrogen.

9. A protective atmosphere as claimed in claim 5, said last-named gas consisting essentially of oxygen and hydrocarbon.

10. A protective atmosphere as claimed in claim 5, said last-named gas consisting essentially of alcohol and oxygen.

11. A protective atmosphere as claimed in claim 5, said last-named gas consisting essentially of alcohol, oxygen and carbon dioxide.

12. A protective atmosphere as claimed in claim 5, said last-named gas consisting essentially of water and oxygen.

13. A protective atmosphere as claimed in claim 5, said last-named gas consisting essentially of water, oxygen and carbon dioxide.

References Cited

UNITED STATES PATENTS

| | | | |
|---|---|---|---|
| 2,905,805 | 9/1959 | McElrath et al. | 219—74 X |
| 3,139,508 | 6/1964 | Freeman et al. | 219—74 |

JOSEPH V. TRUHE, Primary Examiner

J. G. SMITH, Assistant Examiner